United States Patent
Andrews et al.

(10) Patent No.: US 8,146,062 B2
(45) Date of Patent: Mar. 27, 2012

(54) METHOD AND PROCESS TO AUTOMATICALLY PERFORM TEST BUILDS OF TRANSLATED FILES FOR A SOFTWARE PRODUCT

(75) Inventors: James Neal Andrews, Austin, TX (US); Joseph C. Ross, Georgetown, TX (US); Michael David Skibo, Austin, TX (US); Lum Elijah Twilligear, III, Austin, TX (US); Keiichi Yamamoto, Austin, TX (US); Kin Hung Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/128,415

(22) Filed: May 28, 2008

(65) Prior Publication Data

US 2008/0229287 A1   Sep. 18, 2008

Related U.S. Application Data

(63) Continuation of application No. 11/201,711, filed on Aug. 11, 2005, now abandoned.

(51) Int. Cl.
*G06F 9/45* (2006.01)
(52) U.S. Cl. ........................................ 717/136
(58) Field of Classification Search .................. 717/136, 717/138, 139
See application file for complete search history.

(56) References Cited

U.S. PATENT DOCUMENTS

| | | | |
|---|---|---|---|
| 5,339,435 A | 8/1994 | Lubkin et al. | |
| 6,425,123 B1 * | 7/2002 | Rojas et al. | 717/136 |
| 6,507,812 B1 | 1/2003 | Meade et al. | |
| 6,735,759 B1 | 5/2004 | Yamamoto et al. | |
| 6,983,238 B2 * | 1/2006 | Gao | 704/8 |
| 7,392,507 B2 * | 6/2008 | Kolawa et al. | 717/124 |
| 7,640,251 B2 * | 12/2009 | Sundararajan et al. | 1/1 |
| 2005/0166178 A1 * | 7/2005 | Masticola et al. | 717/104 |

FOREIGN PATENT DOCUMENTS

| WO | 9966398 | 12/1999 |
|---|---|---|
| WO | 03050742 | 6/2003 |

* cited by examiner

*Primary Examiner* — Anna Deng
(74) *Attorney, Agent, or Firm* — Yee & Associates, P.C.; Steven L. Bennett

(57) ABSTRACT

A method, apparatus, and computer program instructions for automatically performing test builds of natural language translated files for a software product. When a translated file is received from a translator, a test build of the translated file is executed in a translation test build environment, wherein the translation test build environment is separate from the main software product build environment. A determination is made as to whether the test build of the translated file is successful. If the test build is successful, the translated file is submitted to the main software product build environment. If the test build is unsuccessful, a log file containing error information is sent to the translator to allow the translator to fix compile errors identified in the translated file and resubmit the translated file to the translation test build environment.

15 Claims, 4 Drawing Sheets

METHOD AND PROCESS TO AUTOMATICALLY PERFORM TEST BUILDS OF TRANSLATED FILES FOR A SOFTWARE PRODUCT

This application is a continuation of application Ser. No. 11/201,711, filed Aug. 11, 2005, status pending.

BACKGROUND OF THE INVENTION

1. Technical Field

The present invention relates to an improved data processing system and, in particular, to multiple language program development. Still more particularly, the present invention provides a method, apparatus, and computer program for automatically performing test builds of natural language translated files for a software product.

2. Description of Related Art

In a typical software development environment, software products are created in one particular language. At a later time, these software programs may be adapted to operate in a market or country other than the one for which it was originally designed. In order to "localize" the software product, translators are used to translate the software products and adapt the software to ensure the most current use of technical terminology and local norms and idioms.

Natural language translation of software products is difficult, as it is compounded by a number of factors. The setting of an application lies in the interfaces that communicate with the user. As the text that is to be translated is disassociated from the interface and moved into resource files, a translator may have little experience with the program content and the actual interfaces from which the context is derived. As a result, certain key elements in the resource files, when incorrectly translated, can cause product build breaks.

Because translators are not normally software developers and typically do not work in a software development environment, translators do not always have the tools or skills available to ensure that the files they are translating will not break product builds when the translated files are incorporated into the build. Build breaks, when they occur, negatively impact software product release schedules, as well as increase the cost of development of the product.

Therefore, it would be advantageous to provide a mechanism for automatically performing test builds of translated files for software products in multiple natural language application development.

SUMMARY OF THE INVENTION

The present invention provides a separate, simplified, remotely accessible, and automated build environment for natural language translators to use. The build environment of the present invention provides for automatically performing test builds of translated files for a software product. When a translated file is received from a translator, a test build of the translated file is executed in a translation test build environment, wherein the translation test build environment is separate from a main software product build environment. A determination is made as to whether the test build of the translated file is successful. If the test build is successful, the translated file is submitted to the main software product build environment. If the test build is unsuccessful, a log file containing error information is sent to the translator to allow the translator to fix compile errors identified in the translated file and resubmit the translated file to the translation test build environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
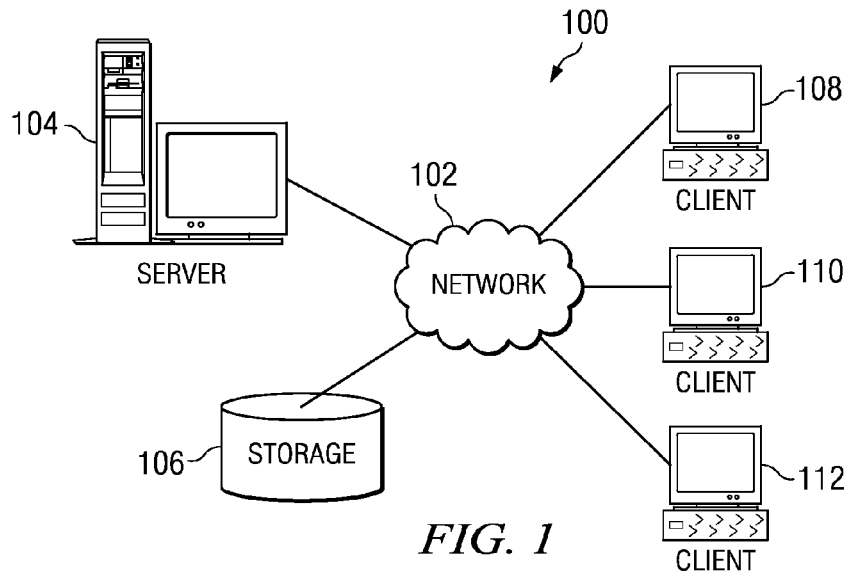
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 and provides access to storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Software developers may provide application source and resource files at a client, such as one of clients 108, 110, 112. These files may be stored at the client workstation or at a server. For example, application source and resource files may be stored in storage 106. Server 104 may facilitate access to the files in storage 106 using, for example, File Transfer Protocol (FTP) or HyperText Transfer Protocol (HTTP).

Application files may be provided to a natural language translator at a client, which may be another one of clients 108, 110, 112. The translator may receive application files through, for example, direct file transfer, electronic mail, or by download from server 104.

However, once the software files are translated, translators do not currently have a testing environment to test the translated file for potential compiling problems. Since natural language translators are not normally software developers and typically do not work in a software development environment, these translators do not have the tools or skills available to ensure that the files they are translating will not break product builds when the translated files are incorporated into the build.

For example, when a translator receives a text string for translation, the translator may open and edit the file with any text editor. The translator translates the text, and then sends the translated file to the server to be incorporated into the product build. If the translated file containing an error is incorporated into a product release, when a build is performed on a product release, the translated file can result in a compiler break. When a break occurs, the translator must fix the translated file and resubmit the file into the product build. The back and forth iteration between the translator and the server to fix compile errors and achieve a successful product build is labor intensive.

The present invention overcomes this problem by providing an automated test build environment for natural language translators of software products to use. The present invention provides a mechanism for automatically performing a test compile on a translated file prior to accepting the file from the translator and integrating the translation into the product build. Although the individual components used in the present invention may be conventional devices, the combination of these components to form an automated test build environment is unique and original for the applicable software development environment.

The automated test build environment is separate from the main build environment where the base software product is built; any compile problems encountered during the test build of the translated file will not affect the base product. In addition, the build environment is simplified as it may be customized to only build the translated material supplied by the translator. Consequently, the natural language translated material should build very quickly.

Furthermore, for the convenience of translators, who are typically located in different countries, the test build environment of the present invention is remotely accessible via a Web browser. Thus, a translator at any location may access the test build environment through the translator's Web browser. In addition, the test build environment is automated and available at all times to accommodate work hours from any time zone.

Figure 2:
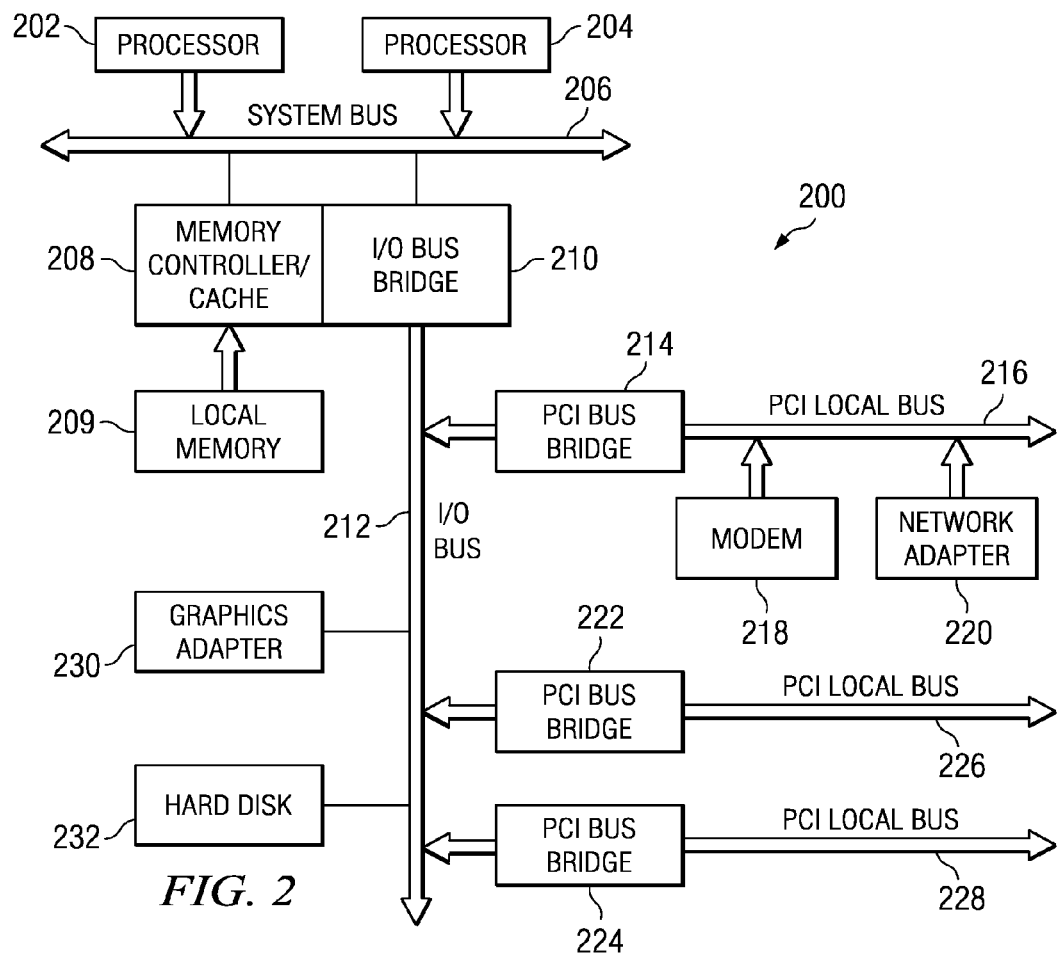
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
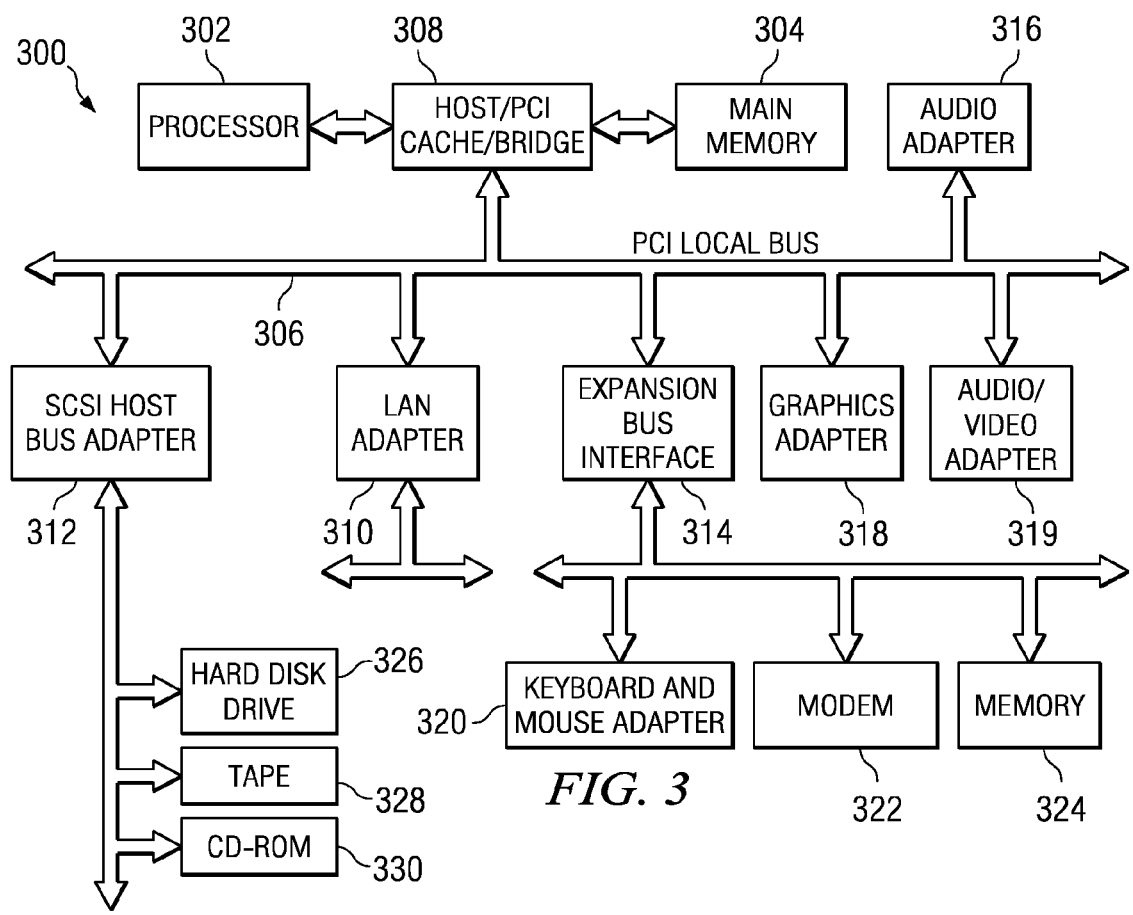
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
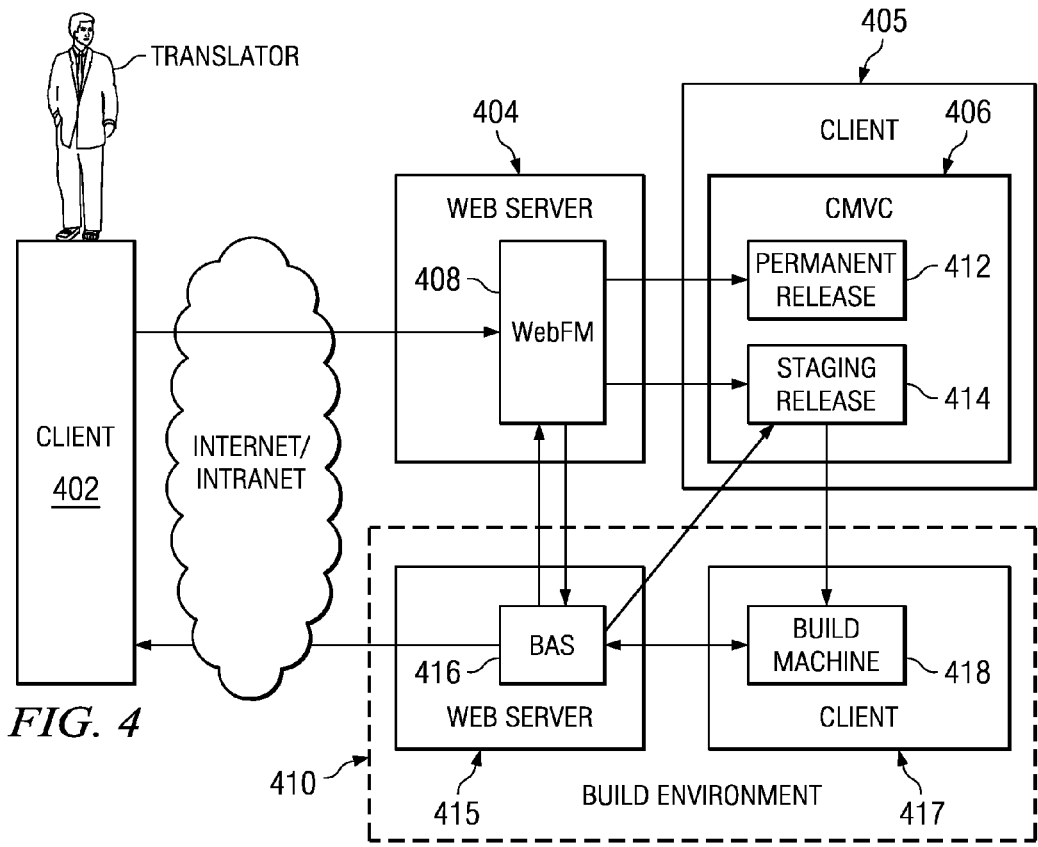
FIG. 4 is a block diagram illustrating components used in test compiling translated files for a software product prior to accepting the files from translators in accordance with a preferred embodiment of the present invention.

Turning next to FIG. 4, a block diagram illustrating components used in test compiling translated files for a software product prior to accepting the files from translators is depicted in accordance with a preferred embodiment of the present invention. Clients 402, 405, and 417 are examples of a client, such as clients 108, 110, and 112 in FIG. 1. Clients 402, 405, and 417 may be executing on a data processing system, such as data processing system 300 in FIG. 3. Web servers 404 and 405 are examples of a server, such as server 104 in FIG. 1. Web servers 404 and 405 may be executing on a data processing system, such as data processing system 200 in FIG. 2.

A translator triggers the automated test build process of the present invention by submitting the translated file to Web-based application for remote file management 408. In this illustrative example, Web-based application for remote file management 408 is located within Web server 404. Web-based application for remote file management 408 may provide the only interface with which the translator needs to interact. It hides the complexities of the configuration components used to build and store software product releases, as well as the automated test build environment. One example of such a Web-based application is Web File Management (WebFM), a product developed by International Business Machines Corporation. WebFM enables the remote manipulation of files using a standard Web browser interface. Examples of such file manipulations include the check-in of files into a configuration management tool, file naming, and path substitutions. WebFM also performs static analysis on file contents, such as file encodings.

In this example, a translator at client 402 first connects to Web server 404 using a universal resource locator (URL) to establish the Web server identity by reference. The translator at client 402 then submits a translation to Web server 404. The translation submission may take many forms, such as a zip, hex, tar, tpt, or any other archive package of individual files. The submission contains translated text of a software product. The submission of translations is facilitated through Web-based application 408. For example, when the translator is ready to send the translation, the translator may select a "submit files" button provided by the Web-based application to send the translation to Web server 404.

When Web-based application 408 in Web server 404 receives the translated text, Web-based application 408 automatically checks the translation into a configuration management tool. In this illustrative example, configuration management tool is hosted in a client machine, such as client 405. Configuration management tool 406 may be any configuration management product that allows for retaining versions of individual files and recording configurations of product releases. Configuration management tool 406 is used to retain versions of individual files and record exact configurations of larger software entities such as product releases. An example of such a configuration management tool is Configuration Management Version Control (CMVC), a product of International Business Machines Corporation.

Configuration management tool 406 comprises, in this illustrative example, permanent release component 412 and staging release component 414. Permanent release component 412 is used to retain accepted translations. Staging release component 414 is used to retain translations submitted from the translator prior to the translations being accepted into permanent release component 412. When a translation is received from client 402, Web-based application 408 checks the translation into configuration management tool 406 under staging release component 414. It should be noted that those of ordinary skill in the art will appreciate that the present invention is not limited to configuration management systems with release component schemas. For example, rather than having a translation reside in a release component in the configuration management tool as described above, a translated file may simply exist in a staging directory in a file system, awaiting build results.

When Web-based application 408 receives the translated text, Web-based application 408 also automatically interfaces with build environment 410. Build environment 410 comprises build automation system 416 and build machine 418. Build environment 410 is separate from the main build environment and may be used to build only those translations submitted by the translators.

Build environment 410 is made transparent to the translator by Web-based application 408 and may be customized to only build the translated material supplied by the translator. A test build of the submitted files is automatically scheduled by Web-based application 408. As build environment 410 is isolated from the main build environment where the base software product is built, any compile problems encountered during the build of the translated file will not affect the base product.

In particular, Web-based application 408 interfaces with build automation system (BAS) 416 in build environment 410 and submits a test built request to BAS 416 for the translations in staging release component 414. In this example, BAS 416 is hosted within a Web server, such as Web server 415. BAS 416 is used to schedule and initiate product builds. Rather than requiring the translator to initiate a test build, the present invention provides a command line interface in BAS 416, which is used by Web-based application 408 to submit the test built request. In this manner, Web-based application 408 may automatically initiate a test build, thus trivializing that task for the translator.

In response to receiving a build request, BAS 416 extracts the translations retained in staging release component 414 in configuration management tool 406. BAS 416 places the extracted translations into build machine 418. BAS 416 then signals build machine 418 to execute the test build. In this example, build machine 418 is hosted in an independent client machine, such as client 417.

The test build, if successful, means that the translated file will not cause a compiler break when the translated file is incorporated into the main build of the software product. If the test build is successful, BAS 416 sends a signal back to Web-based application 408 indicating that the translation is acceptable. In response, Web-based application 408 checks the translation into configuration management tool 406 under permanent release component 412.

In one embodiment, when Web-based application 408 receives the signal from BAS 416 that the test build was successful, the translator is notified through Web-based application 408 that the translation is acceptable. For instance, in the previous example, a "submit files" button was presented to the translator to allow the translator to send the translation for testing. At this time, a second button, which was disabled prior to the translation test build, is presented to the translator via Web-based application 408. The second button, such as a "finish" button, is used to check in the translated files into permanent release 412.

If the test build is not successful, BAS 416 creates a log file of the test build. The log file contains detailed debugging information regarding the unsuccessful build. BAS 416 sends the log file to the translator at client 402. BAS may send the log file to the translator via Web-based application 408 or via an email notification. The translator may use the log file to fix compile errors identified in the defective translated files, and then resubmit the translations to Web-based application 408.

Although the illustrative example in FIG. 4 shows Web-based application 408 and build automation system 416 hosted in independent servers, and configuration management tool 406 and build machine 418 hosted in independent client machines, those of ordinary skill in the art will appreciate that the configuration of these components depicted in FIG. 4 may vary. For instance, Web-based application 408 and build automation system 416 may be hosted in the same Web server, while configuration management tool 406 and build machine 418 are hosted in separate client machines.

In another embodiment, configuration management tool 406, Web-based application 408, and build automation system 416 may be hosted in the same Web server, while build machine 418 is hosted in a separate stand-alone build machine (client). Build automation system 416 and build machine 418 still comprise build environment 410.

Alternatively, configuration management tool 406, Web-based application 408, build automation system 416, and build machine 418 may be hosted in the same Web server. However, in practice, this single server configuration may place too many resource demands and constraints on the host machine.

Figure 5:
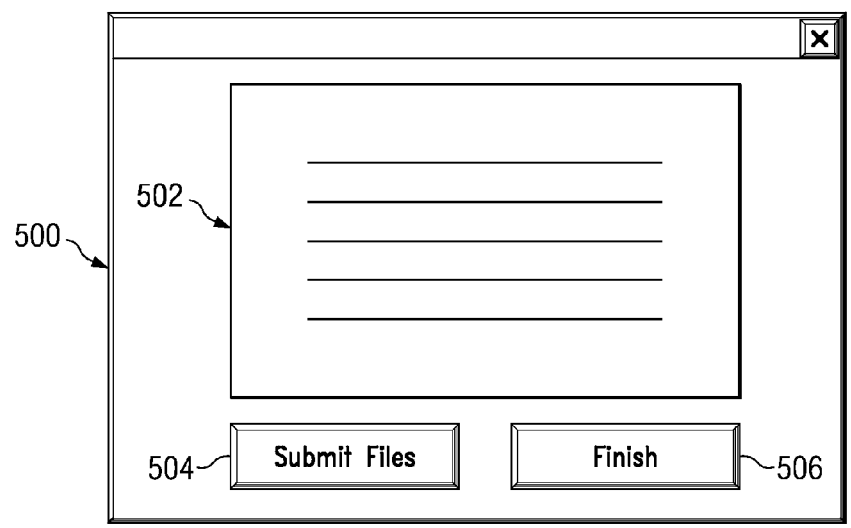
FIG. 5 is a diagram illustrating an example of a Web browser interface in accordance with a preferred embodiment of the present invention.

FIG. 5 is a diagram illustrating an exemplary user interface that may be presented by Web-based application 408 from FIG. 4. In this example, window 500 is an example of a Web browser window that may be shown on a client, such as clients 108-112 in FIG. 1. Window 500 is presented for purposes of illustration and not meant as a limitation as to how translated files and may be presented, translated, and submitted.

In this illustrative example, window 500 comprises a directory list of translated files being submitted. This directory list allows the translator to view the translated files and select translated files for submission to the server. In an alternative embodiment, not only is the translator able to select a translated file for submission using the directory list, the translator may also be provided with the ability to perform a Web-based natural language translation by allowing the translator to actually translate a file using the interface, or window 500. Window 500 may also contain menu options such as "submit files" button 504 and "finish" button 506. When the translator is finished analyzing a file, the translator may select the translated file in pane 502 and submit the translation to the Web server (and the test build environment) using a menu option such as "submit files" button 504. At this point, since the translation has not yet been accepted by the configuration management tool, "finish" button 506 is not available to be selected by the translator. For example, the finish button may appear on window 500, but may be disabled and not selectable. Alternatively, the finish button may not appear on window 500 at all.

Once a test build is performed, and if the text build is successful, "finish" button 506 is enabled on translation window 500. In this manner, the translator may only submit the translation to the Web server as "finished" (i.e., to be incorporated into the permanent release) when it has been determined that the translated file will not cause a compiler break. If a test build has been performed and the test build is unsuccessful, "finish" button 506 remains disabled to the translator. The translator must fix the compile errors in the translated file and resubmit the translation to be tested in the build environment using "submit files" button 504.

As can be seen, the translation window of the present invention illustrated in FIG. 5 provides the translator with means to submit and finalize translations. Although the example in FIG. 5 illustrates a particular display list of translated files and selectable buttons for submitting the translations, it should be noted that any manner of presenting and submitting translations or translation files may be used.

Figure 6:
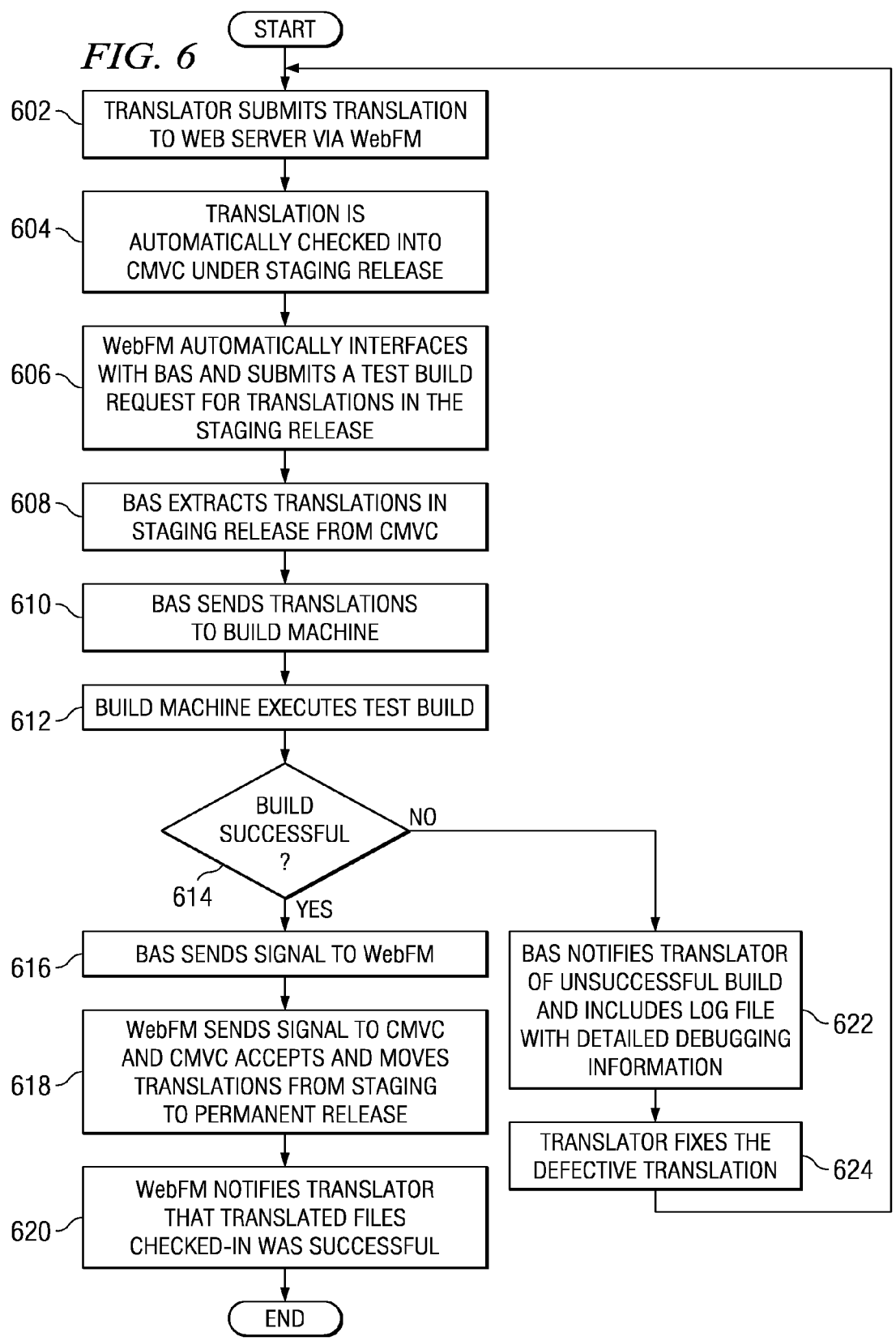
FIG. 6 is a flowchart illustrating a process for automatically performing a test build of translated files for a software product in accordance with a preferred embodiment of the present invention.

FIG. 6 is a flowchart illustrating a process for automatically performing a test build of natural language translated files for a software product in accordance with a preferred embodiment of the present invention. The process illustrated in FIG. 6 may be implemented in a distributed data processing system, such as network data processing system 100 in FIG. 1.

The process begins with a translator submitting a natural language translation to a Web server via a Web-based application, such as, for example, WebFM (step 602). The translation is checked into a configuration management version control component such as, for example, CMVC, and placed within a staging release (step 604). The Web-based application then automatically interfaces with a build automation system in the test build environment and submits a test build request for the translation retained in the staging release (step 606).

Next, the build automation system extracts the translation from the staging release in the configuration management tool (step 608) and sends the translation to a build machine (step 610). The build machine then executes the test build (step 612). A determination is then made as to whether the test build is successful (step 614). If the test build is successful, the build automation system sends a signal to the Web-based application (step 616) that the translation is acceptable. The Web-based application initiates the move of the translated file from the staging release in the configuration management tool to the permanent release (step 618). The Web-based application also notifies the translator that the translated files check-in was successful (step 620). This notification may be performed through the Web-based application or via an email notification.

Turning back to step 614, if a determination is made that the test build was not successful, the build automation system notifies the translator of the defective submission (step 622). The build automation system creates a log file containing detailed debugging information and sends the log file to the translator. In this manner, the translator may use the log file to fix the defective translated file (step 624). Once the translation has been corrected, the process returns to step 602 as the translator resubmits the translation to the Web-based application.

Thus, the present invention provides a method, data processing system, and computer instructions for automatically performing test builds of natural language translated files for software products in multiple language application development. The present invention provides advantages over the current art by providing an automated test build environment that is convenient to use, since it is accessible via a Web browser and is available at all times to accommodate work hours from any time zone. In this manner, the present invention provides translators with an automated testing environment that allows translators to ensure that the files they are translating do not contain potential compilation problems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically performing test builds of natural language translated files for a software product, comprising:
   responsive to receiving a natural language translated file from a client computer, executing a test build of the natural language translated file in a translation test build environment, wherein the translation test build environment is separate from a main software product build environment;
   determining whether the test build of the natural language translated file is successful;
   if the test build is successful, submitting the natural language translated file to the main software product build environment;
   if the test build is unsuccessful, creating a log file containing error information for the test build; and
   sending the log file to the translator, wherein information in the log file allows the translator to fix compile errors identified in the natural language translated file and resubmit the natural language translated file to the translation test build environment for testing;
   wherein the translation test build environment comprises a build automation system and a build machine that interact together to test compilation of the natural language translated file such that any compile problems encountered during a build of the natural language translated file will not affect a base product maintained by the main software product build environment.

2. The method of claim 1, wherein submitting a translation to the main software product build environment includes moving the translation from a staging release to a permanent release.

3. The method of claim 2, wherein the staging release contains translations submitted from a translator prior to the translations being accepted into the permanent release.

4. The method of claim 2, wherein the permanent release contains translations on which a test build has been successfully performed.

5. The method of claim 1, wherein the test build is executed by sending a test build request through a command line interface in the build automation system.

6. The method of claim 1, wherein the translation test build environment is accessible via a Web browser.

7. The method of claim 1, wherein the translation test build environment is accessible at any hour and from any time zone.

8. A data processing system for automatically performing test builds of natural language translated files for a software product, comprising:
   executing means for executing a test build of the natural language translated file in a translation test build environment, wherein the translation test build environment is separate from a main software product build environment in response to receiving a natural language translated file from a client computer;
   determining means for determining whether the test build of the natural language translated file is successful;
   submitting means for submitting the natural language translated file to the main software product build environment if the test build is successful;
   creating means for creating a log file containing error information for the test build if the test build is unsuccessful; and
   sending means for sending the log file to the translator, wherein information in the log file allows the translator to fix compile errors identified in the natural language translated file and resubmit the natural language translated file to the translation test build environment for testing;
   wherein the translation test build environment comprises a build automation system and a build machine that interact together to test compilation of the natural language translated file such that any compile problems encountered during a build of the natural language translated file will not affect a base product maintained by the main software product build environment.

9. The data processing system of claim 8, wherein submitting a translation to the main software product build environment includes moving the translation from a staging release to a permanent release.

10. The data processing system of claim 9, wherein the staging release contains translations submitted from a translator prior to the translations being accepted into the permanent release.

11. The data processing system of claim 9, wherein the permanent release contains translations on which a test build has been successfully performed.

12. The data processing system of claim 8, wherein the test build is executed by sending a test build request through a command line interface in the build automation system.

13. The data processing system of claim 8, wherein the translation test build environment is accessible via a Web browser.

14. A computer program product comprising program instructions stored in a tangible computer readable storage medium for automatically performing test builds of natural language translated files for a software product, said program instructions comprising:

first instructions for executing a test build of the natural language translated file in a translation test build environment, wherein the translation test build environment is separate from a main software product build environment in response to receiving a natural language translated file from a client computer;

second instructions for determining whether the test build of the natural language translated file is successful;

third instructions for submitting the natural language translated file to the main software product build environment if the test build is successful;

fourth instructions for creating a log file containing error information for the test build if the test build is unsuccessful; and fifth instructions for sending the log file to the translator, wherein information in the log file allows the translator to fix compile errors identified in the natural language translated file and resubmit the natural language translated file to the translation test build environment for testing;

wherein the translation test build environment comprises a build automation system and a build machine that interact together to test compilation of the natural language translated file such that any compile problems encountered during a build of the natural language translated file will not affect a base product maintained by the main software product build environment.

15. The computer program product of claim 14, wherein submitting a translation to the main software product build environment includes moving the translation from a staging release to a permanent release.

* * * * *